(12) United States Patent
Butler et al.

(10) Patent No.: US 12,095,253 B2
(45) Date of Patent: Sep. 17, 2024

(54) CONFIGURABLE CIRCUIT PROTECTOR WITH PRE-PROGRAMMED FIELD DEPLOYABLE ADAPTOR

(71) Applicant: EATON INTELLIGENT POWER LIMITED, Dublin (IE)

(72) Inventors: Andrew J. Butler, Baldwinsville, NY (US); Adikaramge Asiri Jayawardena, Manlius, NY (US); Joseph M. Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 161 days.

(21) Appl. No.: 17/807,093

(22) Filed: Jun. 15, 2022

(65) Prior Publication Data

US 2022/0407304 A1    Dec. 22, 2022

Related U.S. Application Data

(60) Provisional application No. 63/211,349, filed on Jun. 16, 2021.

(51) Int. Cl.
*H02H 3/093* (2006.01)
*H02H 1/00* (2006.01)

(52) U.S. Cl.
CPC .......... *H02H 3/093* (2013.01); *H02H 1/0007* (2013.01)

(58) Field of Classification Search
CPC .............. H01H 71/04; H01H 71/1009; H01H 71/1081; H01H 71/123; H01H 9/542; H01H 9/548; H02H 1/0007; H02H 3/006; H02H 3/021; H02H 3/025; H02H 3/08; H02H 3/083; H02H 3/093; H02H 3/165; H02H 3/167; H02H 7/26; H02H 7/30; H02H 9/02
See application file for complete search history.

(56) References Cited

U.S. PATENT DOCUMENTS

| 10,276,321 | B2 | 4/2019 | Kennedy et al. |
| 10,488,528 | B2 * | 11/2019 | Iannce ................. G01S 19/51 |
| 11,037,749 | B2 * | 6/2021 | Kouroussis ............ H02H 3/025 |

(Continued)

FOREIGN PATENT DOCUMENTS

EP    3 739 707 A1    11/2020

OTHER PUBLICATIONS

International Search Report and Written Opinion for Application No. PCT/EP2022/025278 mailed Nov. 2, 2022.

*Primary Examiner* — Jared Fureman
*Assistant Examiner* — Nicolas Bellido
(74) *Attorney, Agent, or Firm* — MERCHANT & GOULD P.C.

(57) ABSTRACT

An electrical circuit protection device a processor-based controller configured to operate at least one solid state switching element in a manner responsive to a variety of different time-current conditions to protect a plurality of different electrical loads. A field deployable adaptor device is configured to communicate with the controller. The controller is configured with at least one pre-preprogrammed control algorithm or at least one selected setting for a control algorithm executable by the controller. At least one pre-preprogrammed control algorithm or at least one selected setting are predetermined by a manufacturer of the circuit protector device.

20 Claims, 11 Drawing Sheets

(56) References Cited

U.S. PATENT DOCUMENTS

| | | | |
|---|---|---|---|
| 11,615,925 B2 * | 3/2023 | Manahan | H02H 3/006 |
| | | | 307/113 |
| 2014/0118875 A1 * | 5/2014 | Carlino | H01H 71/74 |
| | | | 361/93.2 |
| 2016/0294179 A1 * | 10/2016 | Kennedy | H02H 7/261 |
| 2017/0256934 A1 | 9/2017 | Kennedy et al. | |
| 2018/0366936 A1 | 12/2018 | Kennedy et al. | |
| 2019/0103742 A1 | 4/2019 | Kennedy et al. | |
| 2019/0253267 A1 * | 8/2019 | Ambrosino | H02J 13/00026 |
| 2019/0341213 A1 | 11/2019 | Kouroussis et al. | |
| 2020/0177072 A1 * | 6/2020 | Bakovic | G06F 1/30 |
| 2020/0211792 A1 | 7/2020 | Manahan et al. | |
| 2020/0212666 A1 | 7/2020 | Manahan et al. | |
| 2022/0231497 A1 | 7/2022 | Behringer et al. | |

* cited by examiner

CONFIGURABLE CIRCUIT PROTECTOR WITH PRE-PROGRAMMED FIELD DEPLOYABLE ADAPTOR

CROSS REFERENCE TO RELATED APPLICATIONS

The present application claims the benefit of U.S. Provisional Patent Application Ser. No. 63/211,349, filed Jun. 16, 2021, which is hereby incorporated by reference in its entirety. To the extent appropriate, a claim of priority is made to the above disclosed application.

BACKGROUND OF THE INVENTION

The field of invention relates generally to circuit protection devices, and more specifically, to hazardous environment compliant solid state circuit protection devices including a mechanically separate field deployable adaptor device augmented with wireless communication to reduce user error in a commissioning of the device.

Solid State circuit protection devices, such as solid state circuit breakers, use semiconductor electronics and software to interrupt a flow of current when the current exceeds a specified value, sometimes referred to as an overcurrent value. The semiconductor switches rapidly isolate load-side circuit components and circuit wiring from potentially damaging and undesirable exposure to excess currents. Programmable electronic controls and intelligence affords some sophisticated capability to custom program, or otherwise to finely adjust or select optimal trip characteristics for specific loads.

In general solid state circuit protection devices present a risk of being unintentionally or incorrectly programmed, resulting in unintended consequences that may compromise safety of the device and/or its ability to protect connected loads as it was designed to do. Improper settings, which may be intentionally or inadvertently made, may result in excessive thermal or electrical energy being generated in the circuit protector device and/or in the electrical loads and load-side wiring, possibly present possible ignition sources in a combustible or flammable environment.

While known solid state circuit protection devices have much promise to meet the unique needs of power systems operating in hazardous environments, they remain disadvantaged to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
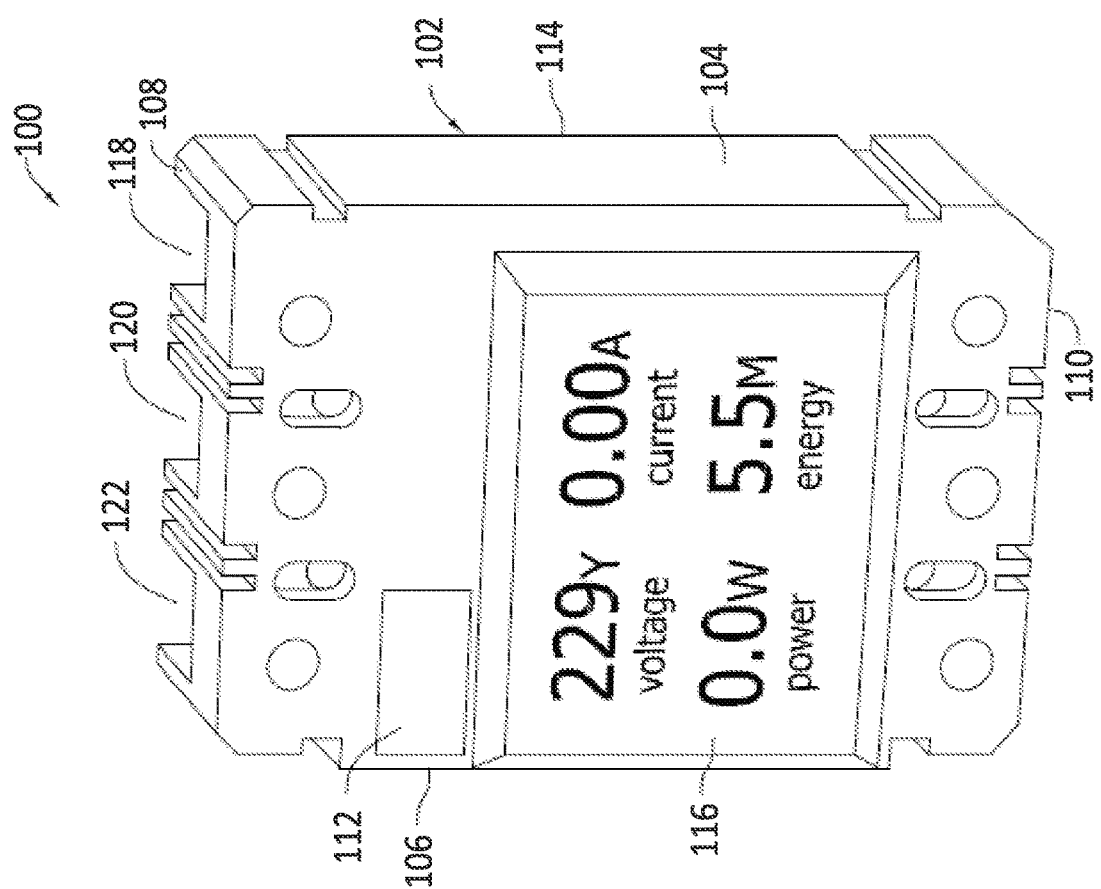
FIG. 1 is a perspective view of a compliant, hazardous location arc-less circuit device according to a first exemplary embodiment of the invention.

In order to understand the inventive concepts described herein to their fullest extent, some discussion of the state of the art and certain problems and disadvantages concerning hazardous environment compliant circuit protection devices with respect to field deployable adaptor devices is warranted.

Electrical power systems sometimes operate within hazardous environments presenting a risk of explosion via ignition of a surrounding gas or vapor dusts, fibers, or flyings. Such hazardous environments may arise in, for example only, petroleum refineries, petrochemical plants, grain silos, wastewater and/or treatment facilities, among other industrial facilities in which sustained or volatile conditions in the ambient environment may be present and may present a heightened risk of fire or explosion. An occasional or continuous presence of airborne ignitable gas, ignitable vapors or ignitable dust, or otherwise flammable substances presents substantial concerns regarding safe and reliable operation of such facilities overall, including, but not limited to, safe operation of the electrical power system itself, which in some instances by virtue of conventional circuit protector devices may produce ignition sources in normal operation and in the presence of an electrical fault. As such, a number of standards have been promulgated relating to electrical product use in hazardous environments to improve safety in hazardous locations in view of an assessed probability of explosion or fire risk.

For example, Underwriter's Laboratories ("UL") standard UL1203 sets forth Explosion-Proof and Dust-Ignition-Proof Electrical Equipment criteria for hazardous locations. Explosion-Proof and Dust-Ignition-Proof enclosures are presently available to enclose or contain electrical products, including but not necessarily limited to circuit protection devices that are not themselves Explosion-Proof or Dust-Ignition-Proof. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of standard UL1203.

The National Electric Code (NEC) Article 500 sets forth a hazardous location coding system, and the NEC generally classifies hazardous locations by class and division. Class I locations are those locations in which flammable vapors and gases may be present. Class II locations are those in which combustible dust may be found. Class III locations are those locations which are hazardous because of the presence of easily ignitable fibers or flyings. Class I, Division 1 covers locations where flammable gases or vapors may exist under normal operating conditions, under frequent repair or maintenance operations, or where breakdown or faulty operation of process equipment might also cause simultaneous failure of electrical equipment. Class I, Division 2 covers locations where flammable gases, vapors or volatile liquids are handled either in a closed system, or confined within suitable enclosures, or where hazardous concentrations are normally prevented by positive mechanical ventilation. Areas adjacent to Division 1 locations, into which gases might occasionally flow, would also be Division 2. Similar divisions are defined in the NEC for the remaining classes.

The International Electrotechnical Commission (IEC) likewise categorizes hazardous locations into Zone 0, 1, or 2 representing locations in which flammable gases or vapors are or may be airborne in an amount sufficient to produce explosive or ignitable mixtures. As defined in the IEC, a Zone 0 location is a location in which ignitable concentrations of flammable gases or vapors are likely to exist under normal operating conditions; or in which ignitable concentrations of flammable gases or vapors may exist frequently because of repair or maintenance operations or because of leakage; or in which equipment is operated or processes are carried on, of such a nature that equipment breakdown or faulty operations could result in the release of ignitable concentrations of flammable gases or vapors and also cause simultaneous failure of electrical equipment in a mode to cause the electrical equipment to become a source of ignition; or that is adjacent to a Zone 1 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, most hazardous equipment, particularly switch gear products of an electrical power system, are installed for use in Division 2 or Zone 1 (or 2) areas. Given that electrical devices, such as those described below, can be ignition sources in certain circumstances, explosion-proof, flame-proof, or ignition proof enclosures are conventionally provided in NEC Division 2 locations and/or IEC Zone 1 locations to house electrical devices that otherwise pose possible ignition risk. The terms "explosion-proof" or "flame-proof" in this context, refer to enclosures that are designed to be capable of containing an internal explosion of a specified flammable vapor-air mixture. In addition, explosion-proof or flame-proof enclosures must operate at a safe temperature with respect to the surrounding atmosphere.

Available explosion-proof, flame-proof or ignition-proof enclosures are effective to provide safe operation of mechanical switch devices in the NEC Division 1 or 2 location or an IEC Zone 1 location, but generally impart additional costs, occupy valuable space in the electrical power system, and impose certain burdens to the installation and servicing of an electrical power system over time. Obtaining access to the disconnect devices inside the explosion-proof enclosures typically requires a time-consuming removal of a number of fasteners, and after any maintenance procedures are completed all the fasteners must be properly replaced to ensure the desired safety of the explosion-proof enclosure. During maintenance procedures, the area in which the disconnect devices are located are also typically decommissioned (i.e., disconnected) with associated load-side processes shut down to ensure safety during the maintenance procedure. Such decommissions are costly from the perspective of the industrial facility, and limiting or shortening decommissioned downtime is important. It would therefore be desirable in some cases if the explosion-proof enclosures could be eliminated in NEC Division 1 or 2 location or an IEC Zone 1 location while still providing safe disconnect functionality in a hazardous environment. In order to do so, circuit protection devices designed to reduce ignition risks are needed, but at present generally do not exist.

Conventional circuit breaker devices, switch devices of various types, and contactor devices are known to include input terminals connectable to power supply or line-side circuitry, output terminals connectable to one or more electrical loads, and pairs of mechanical switch contacts between the respective input terminals and output terminals. Each pair of mechanical switch contacts typically includes a stationary contact and a movable contact linked to an actuator element that displaces the movable contact along a predetermined path of motion towards and away from the stationary contact to connect and disconnect a circuit path through the device and to therefore electrically connect or disconnect the input and output terminals. When the switch contacts are opened, the device serves to isolate the electrical load(s) connected to the output terminals from the power supply connected to the input terminals. The actuator element in the mechanical switch devices described above may be automatically movable for circuit protection purposes to open the mechanical switch contacts in response to overcurrent or fault conditions in the line-side circuit and electrically isolate the electrical load(s) to prevent them from being damaged, or the actuator element may be manually movable to electrically isolate the electrical loads from the line-side power source for energy conservation, maintenance of the load, etc.

Circuit breakers and fusible disconnect switch devices are two well-known types of devices that each provide a different type of disconnect functionality and circuit protection via mechanical switch contacts. The IEC includes the following pertinent definitions:

2.2.11

Circuit-Breaker mechanical switching device, capable of making, carrying and breaking currents under normal circuit conditions and also making, carrying for a specified time and breaking currents under specified abnormal circuit conditions such as those of short circuit [441-14-20]

2.2.9

Switch (Mechanical)

mechanical switching device capable of making, carrying and breaking currents under normal circuit conditions which may include specified operating overload conditions and also carrying for a specified time currents under specified abnormal circuit conditions such as those of short circuit [441-14-10]

NOTE A switch may be capable of making but not breaking short-circuit currents.

2.2.1
Switching Device
device designed to make or break the current in one or more electric circuits [441-14-01]
NOTE A switching device may perform one or both of these operations.

It is seen from the definitions above that the circuit breaker as defined in IEC 2.2.11 and the mechanical switch as defined in IEC 2.2.9 differ in their capability to mechanically respond to abnormal circuit conditions. Specifically, the circuit breaker, as defined in IEC 2.2.11, can mechanically break short circuit conditions, whereas the mechanical switch as defined in IEC 2.2.9 cannot. Because of this, an electrical fuse is sometimes used in combination with the mechanical switch of IEC 2.2.9 to realize a fusible disconnect switch that can respond to a short circuit condition via operation of the fuse (i.e., an opening of the fuse) rather than operation of the mechanical switch contacts.

In either of the devices of IEC 2.2.11 and 2.2.9, the automatic circuit protection may sometimes be provided solely via the structural design and calibration of the circuit breaker structure or the structure of the fuse element(s) in the fuse, provided that each realizes predetermined time-current characteristics before opening of the circuit. The NEC has defined these two basic types of Overcurrent Protective Devices (OCPDs) as follows:

fuse—An overcurrent protective device with a circuit-opening fusible part that is heated and severed by the passage of overcurrent through it.

circuit—breaker A device designed to open and close a circuit by nonautomatic means and to open the circuit automatically on a predetermined overcurrent without damage to itself when properly applied within its rating.

The NEC also requires that circuits be provided with a disconnecting means, defined as a device, or group of devices, or other means by which the conductors of a circuit can be disconnected from their source of supply. Since fuses are designed to open only when subjected to an overcurrent, fuses generally are applied in conjunction with a separate disconnecting means (NEC Article 240 requires this in many situations), typically some form of a disconnect switch. Since circuit breakers are designed to open and close under manual operation, as well as in response to an overcurrent, a separate disconnecting means is not required.

In some types of circuit protection devices, automatic circuit protection may be realized via electrical sensors included in the device to monitor actual circuit conditions and, in response to predetermined circuit conditions as detected by the sensors, electromechanical trip features may be actuated to automatically open the movable contacts in response to detected overcurrent conditions including overload and short circuit conditions. Once tripped, the circuit breaker may be reset or reclosed to restore affected circuitry through the switch contacts, as the circuit breaker is designed to open the circuit without damage to itself, whereas a fuse opens a circuit via internal degradation of the fuse element(s) to the point where they can no longer carry electrical current. As such, the fuse must be replaced after opening to restore affected circuitry. Combinations of circuit breakers and fuses are also desirable in some instances, with selective coordination thereof, to extend the range of overcurrent conditions that may be addressed as well as to improve response times.

In contrast to the circuit protection devices described above, the "switching device" of IEC 2.2.1 as defined above refers merely to the making and breaking of current, without any reference to making or breaking overcurrent conditions (i.e., overload conditions or short circuit conditions). The "switching device" of IEC 2.2.1 therefore provides a disconnect function, but not a circuit protection function. IEC 2.2.1 also does not require a mechanical switching device at all, but to the extent that a switch device that is not a circuit breaker device actually includes mechanical switch contacts, it could nonetheless present an ignition risk when located in hazardous environments.

More specifically, an operation of mechanical switch contacts to make or break an energized circuit, whether manually actuated by a user under normal circuit conditions or automatically actuated under abnormal circuit conditions, presents a possible ignition source in a hazardous environment. Specifically, as the movable contacts are mechanically displaced away from stationary contacts (i.e., moved from a closed position to an opened position) electrical arcing between the switch contacts tends to result. Similar arcing may occur as the movable contacts are moved back towards the stationary contacts to reclose the device. If such arcing between the switch contacts is realized in the presence of a combustible gas, vapor or substance, the arcing may ignite the gas, vapor or substance. While the mechanical switch contacts are typically enclosed in housings provided with conventional circuit breakers or other mechanical switch devices as well as additional enclosures commonly utilized with panelboards or motor control centers, etc., such housings and enclosures are typically not sufficient to isolate electrical arcing from ignitable, airborne elements. For at least this reason, known devices including mechanical switch contacts are sometimes conventionally located in individual explosion-proof enclosures and again contained in an environmental enclosure, or a system of switches (i.e., a panelboard) that can in turn be installed in a single large explosion-proof enclosure without individual explosion-proof enclosures for the switches provided within an NEC Division 1, or 2 or IEC Zone 1 location to provide the necessary protection.

Of the devices described thus far, circuit breakers, while mechanically breaking a short circuit condition, experience the most intense arcing conditions and therefore have the greatest potential in terms of raw energy and temperature to ignite combustible gases, vapors or substances in a hazardous location. Considering that many industrial power systems and loads operate at relatively high voltage and high current, arc energy and arc temperature in lower current overload conditions and normal conditions is likewise considerable and therefore poses ignition risks. In general, ignition energy resulting from the fault energy is related to the magnitude of the current being interrupted, so the higher the current being interrupted the greater the arcing potential and severity. For example, a 65kAIC interruption is much more significant from the arcing perspective, and hence more hazardous, than a 10kAIC interruption.

Solid state disconnect devices are known that provide desirable disconnect functionality via semiconductor switches or semiconductor devices such as, but not limited to, insulated-gate bipolar transistors (IGBTs), Metal Oxide Semiconductor Field Effect Transistors (MOSFETs) and other known elements that electronically operate in a known manner to preclude current flow through the device and therefore electrically isolate line-side circuitry from load-side circuitry in response to predetermined circuit conditions without utilizing mechanical switch contacts. Such solid state switches may be implemented in circuit breaker devices or used in combination with fuses to address electrical fault conditions in an automatic manner.

Solid state switches beneficially eliminate electrical arcing associated with displacement of mechanical switch contacts as described above, but nonetheless may still present possible ignition sources via heat generated by the solid state switches in use. Depending on the type and concentration of combustible elements in the hazardous location, the surface temperature of the solid state switch devices may rise to the point where spontaneous ignition may occur due to the flash temperature of the specific gas or ignitable substance in the hazardous location, even though no arcing occurs in the switching operation of the device.

So-called hybrid disconnect devices are also known that include a combination of semiconductor switches or semiconductor devices and mechanical switch contacts. Such hybrid devices may likewise be implemented in circuit breaker devices or used in combination with fuses to address electrical fault conditions in an automatic manner. Hybrid disconnect devices present a mix of the issues discussed above from the perspective of possible ignition sources in a hazardous location, and adequate safety in the absence of a complementary use of an explosion-proof enclosure in an NEC Division 2 or IEC Zone 1 location cannot be ensured.

Solid state circuit breakers, among other types of circuit protection devices, are available which feature heavy duty materials and construction to meet the desired safety needs and demands for safe operation in hazardous environments such as those described above. More specifically, solid state circuit breakers have been developed for harsh and hazardous environments, such as being designed to be explosion-protected.

Known solid state circuit protection devices provide detection of both an overload and short circuit condition and respond accordingly. Known devices of this type include components having a current-limiting function and disconnection of loads in electrical fault conditions or abnormal operation of the power system. Such devices may additionally include remote communication capability and issue control outputs, signals or data to upstream and downstream devices and to command centers. Power flow scheduling, low impedance arc flash mitigation, surge protection, thermal memory, and virtual integrated relays for under/over voltage, current, frequency, and phase loss protection may also be featured in known devices, as well as integrated metering and monitoring of voltage, current, power, and temperature.

Conventional, electronically controlled solid state circuit protection devices, whether for a harsh and hazardous location use or a non-harsh and non-hazardous location typically require some programming of trip characteristics and other features through software algorithms. Stock keeping unit (sku) reduction and cost reduction benefits are sometimes managed via pre-programming of the device with more or less universal software algorithms at the original equipment manufacturer (OEM) level, while allowing the user/installer a range of input options to tailor the device for a specific application. For example, adjustable trip characteristics may include dynamic time-current curve adjustments. Dials, knobs, or other input elements may be provided for a user to select one of a plurality of different predetermined settings and/or control algorithms for device to execute. Such devices can be cumbersome for certain users, and present opportunity for user to inadvertently selecting settings that would produce undesired effects or sub-optimal operation of the device.

In some cases, numerous circuit protector devices may have their own individual firmware, which enable each device to work autonomously with limited options for the user to select or adjust, and therefore may be somewhat simple to install with little room for user error. This can, however, present certain limitations on otherwise desirable capabilities of the device to provide desired functions in selected applications by more knowledgeable installers.

Programmable controllers present opportunity to substantially customize software algorithms for particular uses to meet specific needs and objectives. Any user error in programming such a device, including but not necessarily limited to the desired trip characteristics to protect the load-side circuitry can be consequential to the reliable operation of the device to protect the desired loads, which in a hazardous environment may present serious safety concerns.

In view of the above, simpler and more cost effective solid state circuit protection devices for harsh and hazardous environments which are simpler and cheaper to manufacture that provide more robust capabilities while reducing user error in the programming and/or selection of device settings are therefore desired. Cost reduction and reliability improvements are needed to meet longstanding and unfulfilled needs in the marketplace, particularly for circuit protectors configured to meet the unique needs and demands of harsh and hazardous environments.

These and other disadvantages in the art are overcome via a solid state circuit protection device described below that include a field deployable adaptor device having pre-programmed control algorithms or settings for control algorithms that are predetermined by a manufacturer of the circuit protection device. Accordingly, the field deployable adaptor device provides a way for manufacturers to provide a degree of customized programming of the solid state circuit protection device that does not require the end user or installer to configure the device or select the proper settings via programming or otherwise require the end user or installer to make key decisions that will affect the reliability or safety of the device to protect loads in a hazardous environment. Additionally, the field deployable adaptor device beneficially facilitates a production of a more or less universal circuit protection device that does not necessarily require customary labels and user inputs such as dials, knobs or switches to accept user inputs. A universal device for solid state circuit protection simplifies the supply chain for the manufacturer and reduces cost while increasing safety in hazardous and harsh environments.

The field deployable adaptor device may be configured to wirelessly communicate settings and key programming information and provide assurance to users that the correct software algorithms have been installed. The field deployable adaptor device may also be configured to communicate between a first solid state circuit protection device and a plurality of other solid state circuit protection devices through the field deployable adaptor devices to verify that correct software algorithms or settings of software algorithms have been installed. This is especially useful in circuit breaker coordination studies and for upstream and downstream circuit breaker matching in power systems. By having multiple solid state circuit protection devices communicate with one another and with a user, alerts may be communicated to a user with regards to incompatible settings between multiple solid state circuit protection devices.

More specifically, the field deployable adaptor device may be integrated into the solid state circuit protection device as a dongle through a connection port on the protection device and may further operate as a mechanically moveable override toggle switch. The dual-functionality of the adaptor device as a mechanically separate component may have permanent affixed nomenclature to indicate the electrical current rating of the device as is typically done with traditional electromechanical circuit protection devices. Proper identification of the dongle and visual confirmation during normal operation further provide for safe operation in hazardous or harsh environments. Additionally, having a dongle with a device key allows for extra security so a dongle with malicious computer code or software may be rejected by the circuit protection device. The device key allows rejecting of any not approved dongle by the circuit protection device. The device key prevents the user from manipulating the pre-programmed control algorithms or settings of the device.

Exemplary embodiments of circuit protection devices are described herein that specifically address safety needs and requirements for compliance with the applicable standards in NEC Division 1 or 2 location or an IEC Zone 1 or 2 location without necessarily requiring a separately provided explosion-proof, flame-proof or ignition-proof enclosure for the circuit protector. As such, and via the elimination of separately provided explosion-proof, flame-proof or ignition-proof enclosures, the exemplary circuit protection devices described herein may be implemented in an electrical power system at reduced cost and in a reduced amount of space in electrical panels, control centers, and the like. The exemplary circuit protection devices described herein may be provided in a modular and configurable system that facilitates a more economical installation, maintenance and oversight of the electrical power system in a harsh and hazardous location. Method aspects will be in part explicitly discussed and in part apparent from the following description.

While the following discussion is made in the context of solid state circuit protection devices receiving control algorithms settings for control algorithms from field deployable adaptor device, the inventive concepts below are not necessarily limited to solid state circuit protection devices and instead may broadly accrue to other types of circuit protection devices that present similar issues. Likewise, while the inventive concepts are described in the context of hazardous locations such as NEC Division 1 and 2 locations or IEC Zone 1 or 2 locations, the benefits of the concepts described are not necessarily limited to NEC Division 1 or 2 locations or IEC Zone 1 or 2 locations and instead may more broadly apply to other types of hazardous environments, and in some aspects may be beneficially provided for use in non-hazardous locations as desired.

FIG. 1 is a perspective view of a compliant, hazardous environment circuit protection device 100 according to a first exemplary embodiment of the invention. The circuit protection device 100 has a housing 102 having opposing longitudinal sides 104, 106 and opposing lateral sides 108, 110 arranged orthogonally with respect to the longitudinal sides 104, 106. The housing 102 also includes a front side 112 and a rear side 114. The front side 112 may include an optional digital display 116 that functions as a user interface for the circuit protection device 100. As shown, display 116 visually indicates voltage, current, power and energy readings to a person in the vicinity of the circuit protection device 100 and display 116. The housing 102 of system the circuit protector device 100 is fabricated from strategically selected or otherwise custom formulated material (or materials) to withstand all possible electrical operating conditions, and specifically all possible electrical fault conditions including simultaneous fault conditions that may be presented by electrical power systems being protected in a NEC Division 1 or 2 location or an IEC Zone 1 or 2 location.

For compliance in an NEC Division 1 location or an IEC Zone 1 or 2 location, the housing structure and housing material must likewise be further formulated to provide adequate strength to withstand shock and impact forces that may be realized in an explosive environment, as well as to provide chemical resistance to withstand exposure to chemicals in the explosive environment that could otherwise negatively impact the integrity of the device 100. As used herein, "chemical resistance" refers to the strength of the housing material to protect against chemical attack or solvent reaction. Chemical resistance in the housing 102 is the opposite of chemical reactivity that may cause an undesirable chemical effect when the housing 102 is exposed to certain chemicals and/or that my undesirably generate heat and raise the temperature of the housing 102. Chemical resistance, via little or no reactivity to specified chemicals, relates to the resistivity of the housing 102 to corrosive or caustic substances in the environment, including but not limited to airborne gases and vapors. For the device 100, chemical resistance is important to all materials and structure that contributes to the hazardous location compliance described herein.

UL 1203 defines chemical testing that may be applied to determine whether any formulation of a candidate material for the housing 102 is chemically resistant for explosive environment locations. Specifically, UL 1203 chemical testing requires sample housings to be fabricated from the formulation of candidate material in the housing structure desired, and a lengthy exposure of the sample housings to saturated vapors in the air including a number of specified chemicals for a predetermined period of time. The specified chemicals for UL 1203 chemical testing include acetic acid, acetone, ammonium hydroxide, ASTM reference fuel C, diethyl ether, ethyl acetate, ethylene dichloride, furfural, n-hexane, methyl ethyl ketone, methanol, 2-nitropropane, and toluene. Different sample housings are exposed to each chemical for a predetermined period of time, and after exposure to each chemical, the sample housings are inspected to ensure that the housing structure of the samples is not compromised or shows signs of degradation via, for example, discoloration, swelling, shrinking, crazing, cracking, leaching, or dissolving. Sample housings that pass inspection are then subjected to a crush test and compared to the results of crush testing prior to the chemical exposure. If the crushing force of the chemically tested sample housings shows that the chemically tested sample housings withstand at least 85% of the corresponding crush force as tested prior to the chemical exposure, the sample housings are UL 1203 compliant.

The housing 102, via the material from which it is fabricated, should likewise exhibit chemical compatibility with specific chemicals present in a given NEC Division 1 or 2 location or an IEC Zone 1 or 2 location. Chemical compatibility refers to the stability of the housing when exposed to substances in the hazardous location environment. If the housing 102 chemically reacts to a substance in the environment, it is considered incompatible. Accordingly, compatibility testing is nonetheless advisable to confirm chemical compatibility in view of the number of different corrosive or caustic chemicals and substances used across the spectrum of industrial facilities. Different facilities involving different caustic or corrosive substances may demand housings of different materials to address issues presented. Strategic selection and custom formulation of housing materials may be needed for some explosive environments if a universally optimal housing or material formulation cannot be practically determined or economically provided. In some cases, UL 1203 compliance for the housing may obviate a need for chemical compatibility testing in selected facilities, and chemical compatibility testing may accordingly be considered optional.

The material used to fabricate the housing 102 may likewise be strategically selected or otherwise formulated, as well as formed with specific structure, to achieve thermal management and surface temperature goals for the device 100 in operation. Some housing materials may exhibit better thermal performance to distribute and dissipate heat than other materials. For example, specific polymeric resins may be selected or customized, and formulated or processed to realize a housing 102 that will improve thermal performance of the device 100 in use when protecting the electrical power system, both internally to the housing 102 and on its outer surface area such that the outer surface area temperature is maintained at a level below the temperature which could cause ignition in an NEC Division 1 or 2 location or an IEC Zone 1 or 2 location.

For any given housing material, the shape and form factor of the housing 102, including dimensions, contours, etc. may vary the overall thermal performance and surface temperature positively or negatively. For instance, for a given device rating and operating voltage and current of the electrical power system, a housing having a larger outer surface area will generally reduce surface temperature in use as compared to a housing having a smaller outer surface area. The housing structure can be designed to optimize and balance overall package size and configuration with thermal performance.

In some embodiments, the housing 102 may be fabricated from metal or metal alloys, non-metallic insulative materials such as high strength, high performance plastics, or combinations of metallic and non-metallic materials to vary thermal performance and the other considerations above, namely impact resistance and chemical resistance. Encapsulated housing constructions, in whole or in part, are likewise possible. In some instances, the interior of the housing 102 may likewise be filled in whole or in part with dielectric material, dielectric fluid, potting materials, or other filler media such as sand to contain, absorb or dissipate heat and energy of energized electrical conductors and switch components in the device 102 to unsure that the surface temperature of the housing 102 will remain below a selected target temperature to provide a device 100 having a desired temperature classification or temperature rating.

Apart from the materials utilized in its fabrication, the structure of the housing 102 could likewise be designed with heat distribution and dissipation in mind. The housing can be structured strategically to include more than one housing material throughout or at specifically targeted locations in the housing 102. Housing sub-structures could be independently fabricated and provided for assembly to provide additional thermal insulation or thermal conductivity in desired areas of the housing to selectively confine and distribute heat in a strategic manner in select locations. Wall thickness of the housing 102 could likewise be varied to provide greater or lesser degrees of thermal conductivity and heat dissipation in selected portions of the structure or in certain areas of the housing structure at the most desirable locations. Piping, channels, or pockets may be formed to strategically capture generated heat and direct it more efficiently to desired locations for dissipation. Heat sink materials and the like may be included to improve thermal absorption and dissipation. Active cooling elements are likewise possible in which cooling fluids are passed over or through the housing structure, with the housing structure including appropriate structure to facilitate active cooling.

In contemplated embodiments, active cooling elements could be self-contained or separately provided such as in a panelboard application where a number of devices 100 may be provided, with an active cooling system countering the cumulative generation of heat in closely positioned devices 100 and alleviating temperature effects that the devices 100 may have upon one another. The active cooling system may include cooling fans or pumps which circulate fluids in or around a number of devices 100 to effectively manage surface temperatures. Devices 100 including temperature sensors 158 (FIG. 3) may provide feedback signals to an active cooling system to power on when needed and otherwise be powered off. Thermal electrics may also be deployed as may feedback loops with the DC load equipment to reduce available current through the device (thereby reducing heat).

The above thermal management considerations may be pursued in various different combinations, some of which may counteract or obviate a need for other of the considerations. For example, active cooling in some applications may obviate a need for certain features of the housing described, such as a more sophisticated shape and form factor to dissipate heat over a relatively complex surface area.

The lateral sides 108, 110 of the housing 102 each include connection recesses 118, 120, 122 for respective connection to line-side and load-side circuitry. In the example shown in FIG. 1, three connection recesses 118, 120, 122 are provided for respective connection to a three phase power supply, i.e., an alternating current (AC) power supply, on one of the sides 108, 110 and to a load device, on the other.

In contemplated embodiments, specific response characteristics to overcurrent conditions and adjustments in the power output may be selected by the user within a certain range input to the device 100 via the display screen 116, via another user interface including a remote interface, and/or pre-programmed into the device 100. The device 100 may operate according to specified time-current curves or trip profiles suitable to provide adequate protection for connected loads.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for interactive by a user in relation to the display. An input selector such as a toggle switch may also be provided separately from the display 116 to serve as manually operable on/off switches that may intuitively be manually operated by a user. In this case, the toggle switch may emulate a traditional toggle switch to affect a change of state to "on" or "off", it may do so without displacement of mechanical switch contacts because, as explained below, the device 100 does not include mechanical switches. Alternatively, an on/off feature may be built into the display 116 for convenient use by an operator to achieve disconnect switch functionality to connected load side equipment.

The display 116 may be multi-functional to display different screens in response to user activation. In some embodiments the display 116 may be touch sensitive with the user making selections via touching selected areas of the display as prompted. Input selectors such as buttons, knobs, etc. may be separately supplied from the display 116 for user input in relation to prompts or information presented on the display 116. It is recognized, however, that the display or array of displays 116 can be considered optional in certain embodiments and need not be included at all. In further embodiments, additional input/output elements may be provided, whether in the form of a display or other interfaces for user interaction with the device both locally and remotely.

Figure 2:
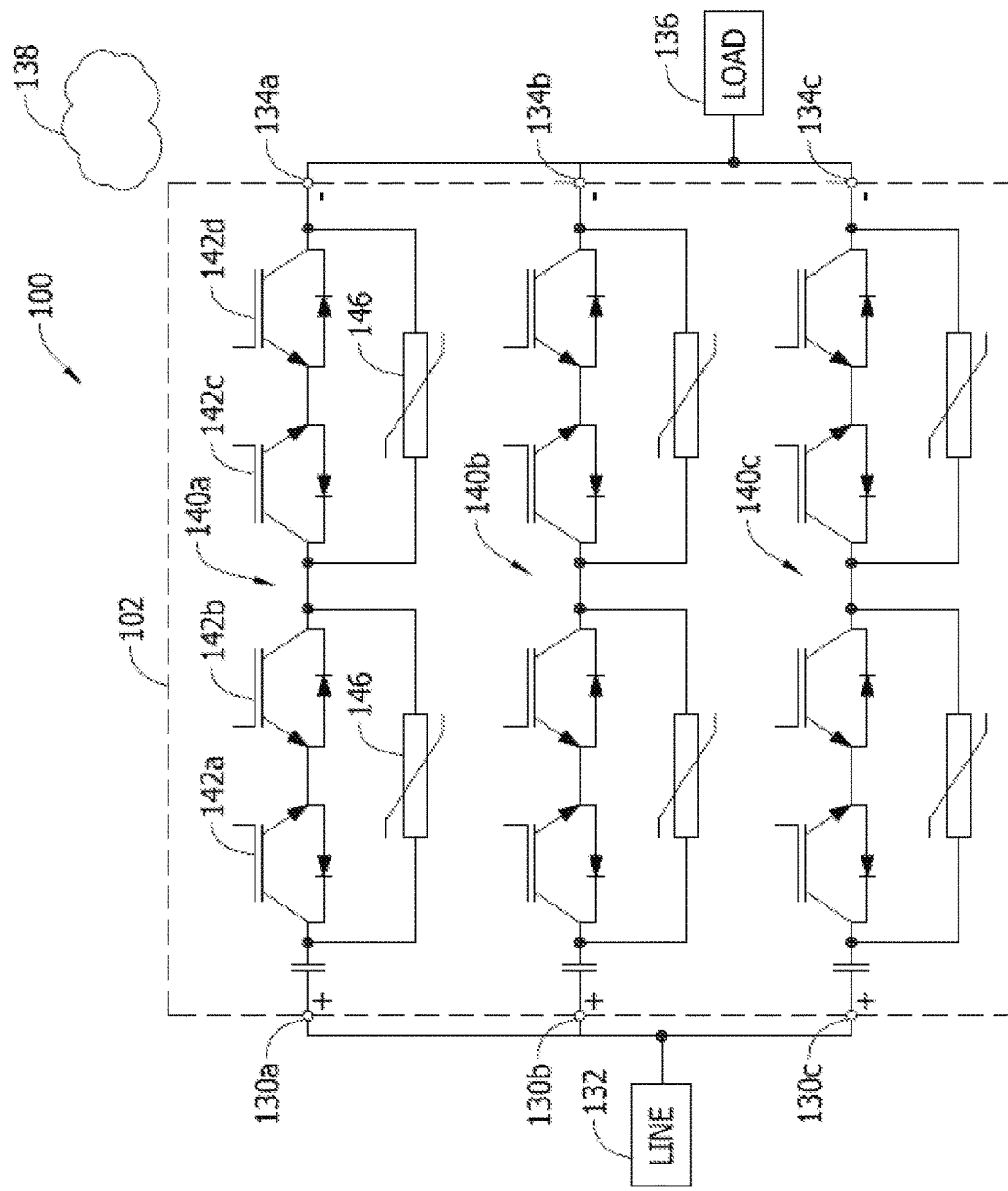
FIG. 2 is a simplified schematic diagram of the circuit protection device shown in FIG. 1 in an exemplary solid state configuration.

FIG. 2 is a simplified schematic diagram of the circuit protection device 100 in an exemplary solid state configuration. The device 100 includes input terminals 130a, 130b, 130c that are each connected to one phase of a three-phase power supply indicated as line-side circuitry 132 in FIG. 2 via connecting cables, conduits, or wires. The device 100 further includes output terminals 134a, 134b, 136c that enable connection to load-side circuitry 136, such as motors, fans, lighting devices, and other electrical equipment in an industrial facility wherein ignitable gas, vapors or substances may be airborne as indicated at 138. Optionally, the device 100 may further include additional elements such as auxiliary contacts and auxiliary connections, shunt trip features, under-voltage release features, communication ports and communication elements, power ports for communication and other purposes, etc.

Between each respective pair of input terminals 130a, 130b, 130c and output terminals 134a, 134b, 136c are solid state switch devices arranged as indicated at 140a, 140b and 140c. The exemplary solid state switch arrangement 140a, 140b, 140c each includes series-connected pairs 142a, 142b, 142c, 142d of insulated-gate bipolar transistors (IGBTs) respectively connected in reverse to one another, with each pair 142a and 142b and 142c and 144d including a varistor element 146 connected in parallel to the IGBTs. The reverse connected IGBTs in each pair precludes reverse current flow through the IGBTs from the load-side circuitry 136 to the line-side circuitry 132 in a known manner.

The IGBTs 142a, 142b, 142c, 142d in each arrangement 140a, 140b, 140c are one form of a semiconductor switch that is operable to either permit current flow between the respective input and output terminals 130a and 134a, 130b and 134b, and 130c and 134c from the line-side circuitry 132 to the load-side circuitry 136 or preclude current from flowing through the device 100 such that the load-side circuitry 136 becomes electrically isolated from the line-side circuitry 132. Briefly, a positive voltage applied from the emitter to the gate terminal of each of the IGBTs causes electrons to be drawn toward the gate terminal across a body region thereof. If the gate-emitter voltage is at or above a threshold voltage, enough electrons are drawn towards the gate to form a conductive channel across the body region, thus allowing current to flow from the collector to the emitter. If the gate-emitter voltage is below the threshold voltage essentially no current can flow across the body region, such that by controlling the gate-emitter voltage, current flow between the input and output terminals may be selectively enabled or disabled to connect or disconnect the output terminals from the input terminals of the device 100 via the IGBTs. Equivalent types of semiconductor switch elements other than IGBT elements may likewise be employed, including, but not limited to, equivalent types of semiconductor switch elements such as Metal Oxide Semiconductor Field Effect Transistor (MOSFET) elements, bipolar transistor elements, silicon controlled rectifier elements (sometimes referred to as thyristors), and the like. The number of semiconductor switch elements may be varied to be greater or less than the number shown in FIG. 2.

The varistor elements 146, connected in parallel to each pair of IGBTs in the arrangement shown, exhibit a relatively high resistance when exposed to a normal operating voltage, and a much lower resistance when exposed to a larger voltage, such as is associated with over-voltage conditions. The impedance of the current path through the varistors 146 is substantially lower than the impedance of the IGBTs when the varistors operate in a low-impedance mode, and is otherwise substantially higher than the impedance of the IGBTs. This means that in normal conditions, the high impedance of the varistors causes all of the current to flow through the IGBTs. However, as over-voltage conditions arise, the varistors switch from the high impedance mode to the low impedance mode and shunt or divert over-voltage-induced current surges away from the IGBTs to the load-side circuitry 136. As over-voltage conditions subside, the varistors may return to a high impedance mode. The varistors beneficially enable, for example, motor inrush currents to flow through the device 100 while otherwise permitting the IGBTs to respond to overcurrent conditions after motor starting is complete. In other applications, however, the varistors 146 may be considered optional and may be omitted.

While exemplary solid state switching arrangements are shown and described, others are possible to achieve solid state switching functionality in an arc-less manner. As discussed above, the solid state switching devices avoid the type of arcing that mechanical switches produce, and therefore avoid such arcing from being a possible ignition source.

Figure 3:
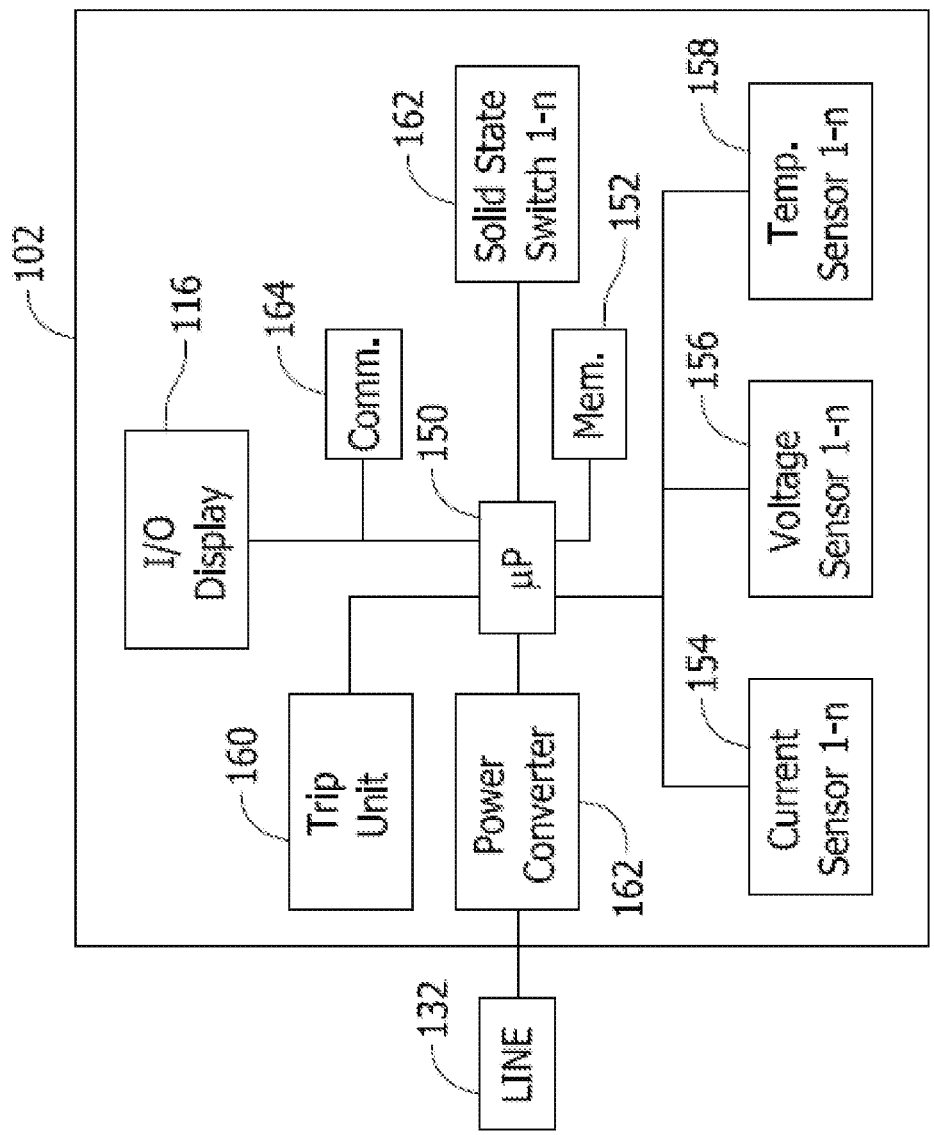
FIG. 3 is a block diagram of the circuit protection device shown in FIGS. 1 and 2.

FIG. 3 is a block diagram of the circuit protection device 100. The device 100 includes a processor-based microcontroller including a processor 150 and a memory storage 152 wherein executable instructions, commands, and control algorithms, as well as other data and information required to satisfactorily operate the device 100 are stored. The memory 152 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

The devices 100 also include sensors 154, 156, 158 provided in a number 1 through n that equals the number of switching poles in the device 100. As such, for the three pole device 100 shown in FIGS. 1 and 2, three sensors of each type may be included that respectively detect current, voltage and temperature at respective locations in the device to assess actual operating circuit conditions in the device. Additional temperature sensors may optionally be provided per switching pole in further embodiments for enhanced temperature monitoring at a plurality of locations in each pole. The sensors 154, 156 and/or 158, in turn, provide inputs to the processor 150. Thus, the processor 150, by virtue of the sensors 154, 156 and/or 158, is provided with real-time information regarding current passing through each of the solid state devices 162 in number 1 through n that equal the number of switching poles in the device 100.

The detected current is monitored and compared to a baseline current condition, such as a time-current curve or trip profile that is programmed and stored in the memory 152 or the trip unit 160. By comparing the detected current with the baseline current condition, decisions can be made by the processor 150 to control the solid state switching devices 162, by controlling an output voltage to the gate-emitter voltage in the IGBT's described above, to cease conducting current to protect the load-side circuitry from damaging currents. In some embodiments, the trip unit 160 enables the user to select settings for the operation of the trip unit 160 and alter the time-current response of the device 100 within predetermined limits. In one example, a user may select a current rating of the device 100 at a value from 50A to 100A, with the trip unit 160 applying the appropriate time-current curve or time-current profile for the selected current rating.

The detected voltage may likewise be monitored and used as a basis in making control decisions, such as whether to operate the solid state switching elements 162 to protect the load-side circuitry and components from adverse operating conditions. Since voltage and current are related, detected voltage can be compared to detected current to facilitate an assessment of the health of the device 100, identify errors, and facilitate diagnosis and troubleshooting of the electrical power system. As other failsafe measures, voltage and current can be calculated from sensed parameters and compared to the sensor feedback to detect error conditions.

The detected temperature may likewise be monitored and used to make control decisions whether to operate the solid state switching elements 162 to protect the load-side circuitry and components from adverse operating conditions. Additionally, the detected temperature may ensure that conductors in the device 100 are operating below rated temperatures for the particular hazardous location in which it resides. For example, if the rated temperature is 200° F., the processor 150 can operate the solid state switches 162 to disconnect and cease current flow when the operating temperature as indicated by the temperature sensors has risen to near 200° F. that could ignite airborne gases, vapors or substances in the hazardous locations.

The processor 150 is in communication with the input/output display 116 to provide feedback to a user and to accept inputs made via the display 116.

In the example shown, the processor 150 receives line-side power through power converter circuitry 162. The power converter circuitry 162 includes step down components and analog to digital conversion components when necessary to supply direct current (DC) power to the processor 150 at reduced voltage in a known manner. Conversion of the line power to appropriate levels to power the electronics avoids any need for an independent power supply, such as batteries and the like or a separately provided power line for the electronic circuitry and controls that would otherwise be necessary, although in some embodiments such an independent power supply may indeed be included if needed or as desired. The controls described may be implemented on a circuit board in various arrangements of electronic packages, with algorithmic control features programmed and stored in the device memory.

A communication element 164 is also included that may communicate data to a remote location to assess operation of the larger electrical power system. Wireless and non-wireless communication of data of interest, including but not limited to current data, voltage data (including waveform data), temperature data, on-off status data of the solid state switching elements, selected setting data, trip time data, etc. is possible, and such data may be stored and archived locally and remotely for analysis of the electrical power system over time. Remote actuation of the device 100 is also possible via the communication element 164.

While an exemplary architecture of the device 100 has been described, it is understood that certain elements shown in FIG. 3 may be considered optional to provide more basic functionality. Moreover, additional elements could be added to realize still further sophistication and intelligence in the operation of the device 100, as well as to provide additional functionality beyond circuit protection and disconnection functionality.

FIGS. 4-7B are perspective views, front views, and side views of a compliant, hazardous environment circuit protection device 200 according to a second exemplary embodiment of the invention. Although shown as a separate embodiment, FIGS. 4-7B may also include features of the circuit protection device 100. Further, FIG. 4-7B may also include any features of the circuit protection device 300 described below in relation to FIGS. 8-10

Figure 4:
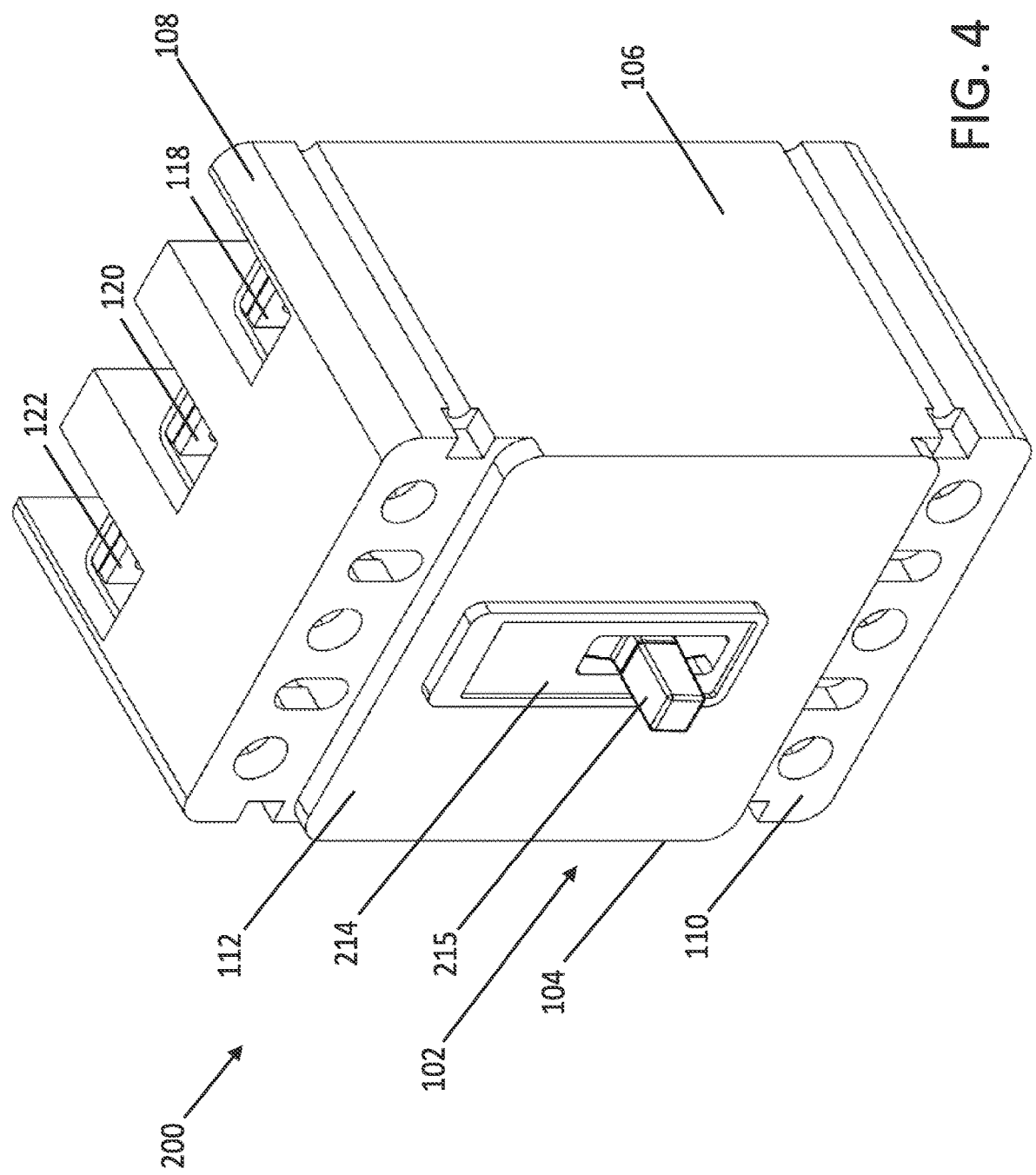
FIG. 4 is a perspective view of a compliant, hazardous location solid state circuit protection device according to a second exemplary embodiment of the invention.
Figure 5:
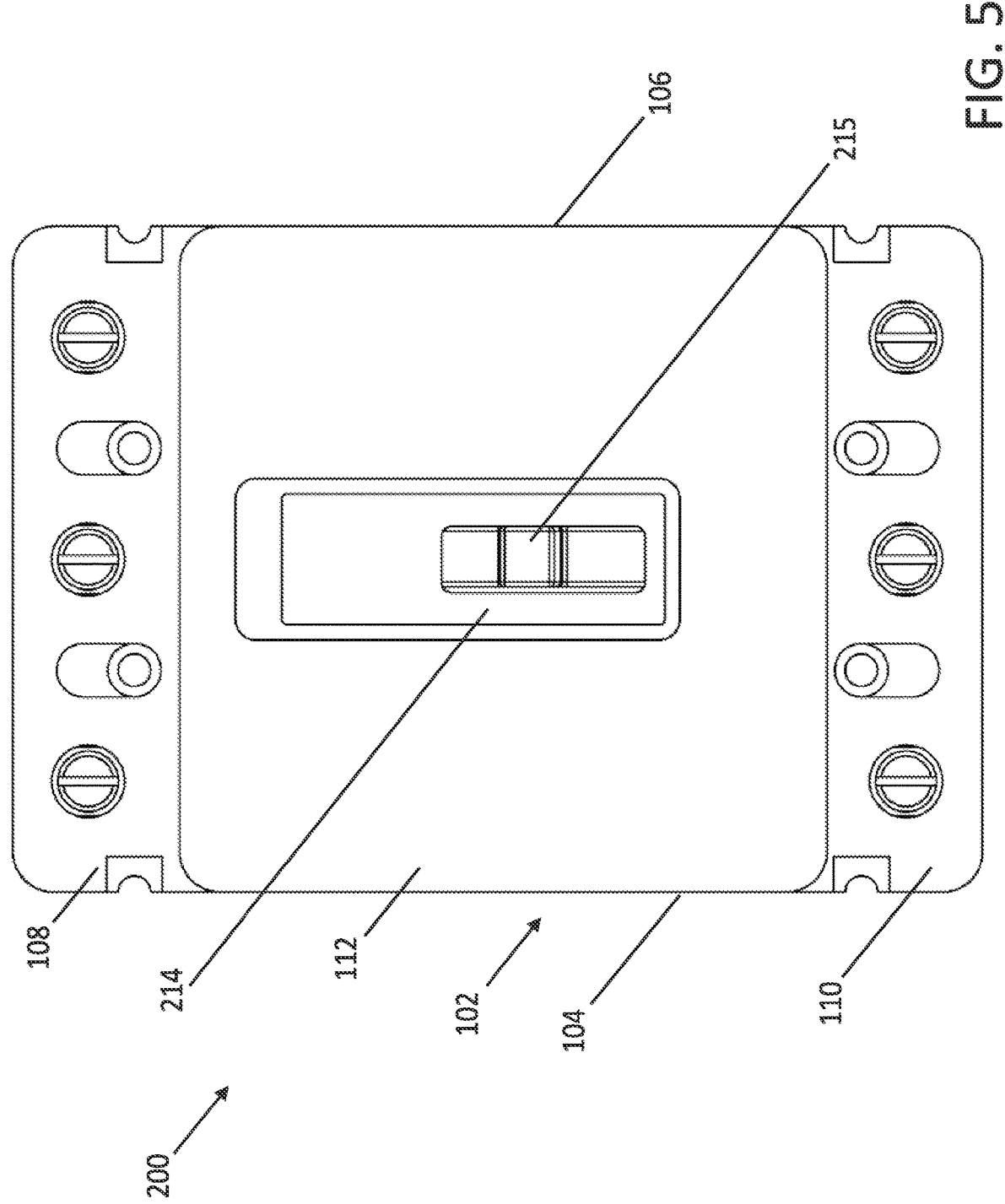
FIG. 5 is a front view of a compliant, hazardous location solid state circuit protection device according to a second exemplary embodiment of the invention.
Figure 6:
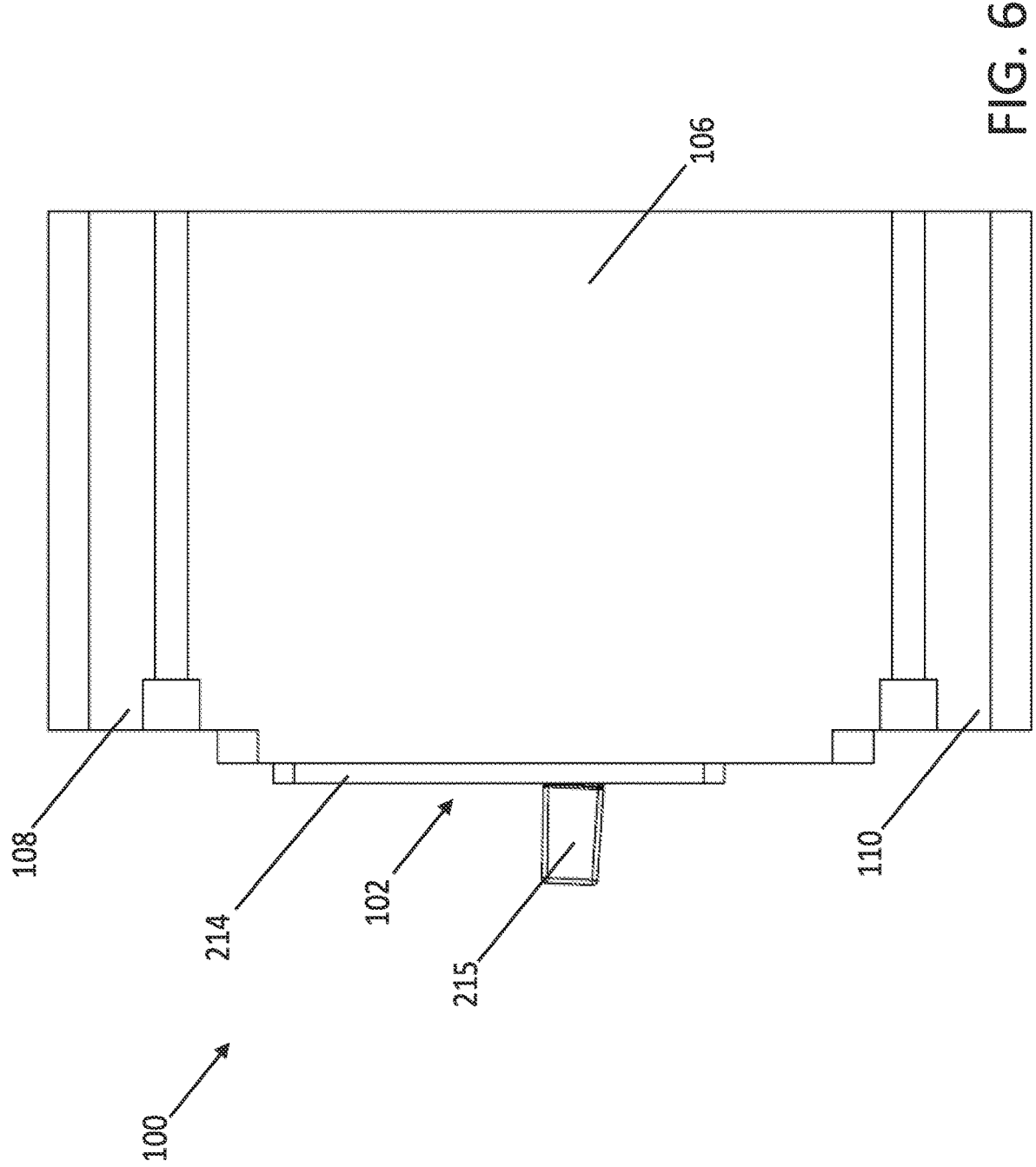
FIG. 6 is a side view of a compliant, hazardous location solid state circuit protection device according to a second exemplary embodiment of the invention.
Figure 7A:
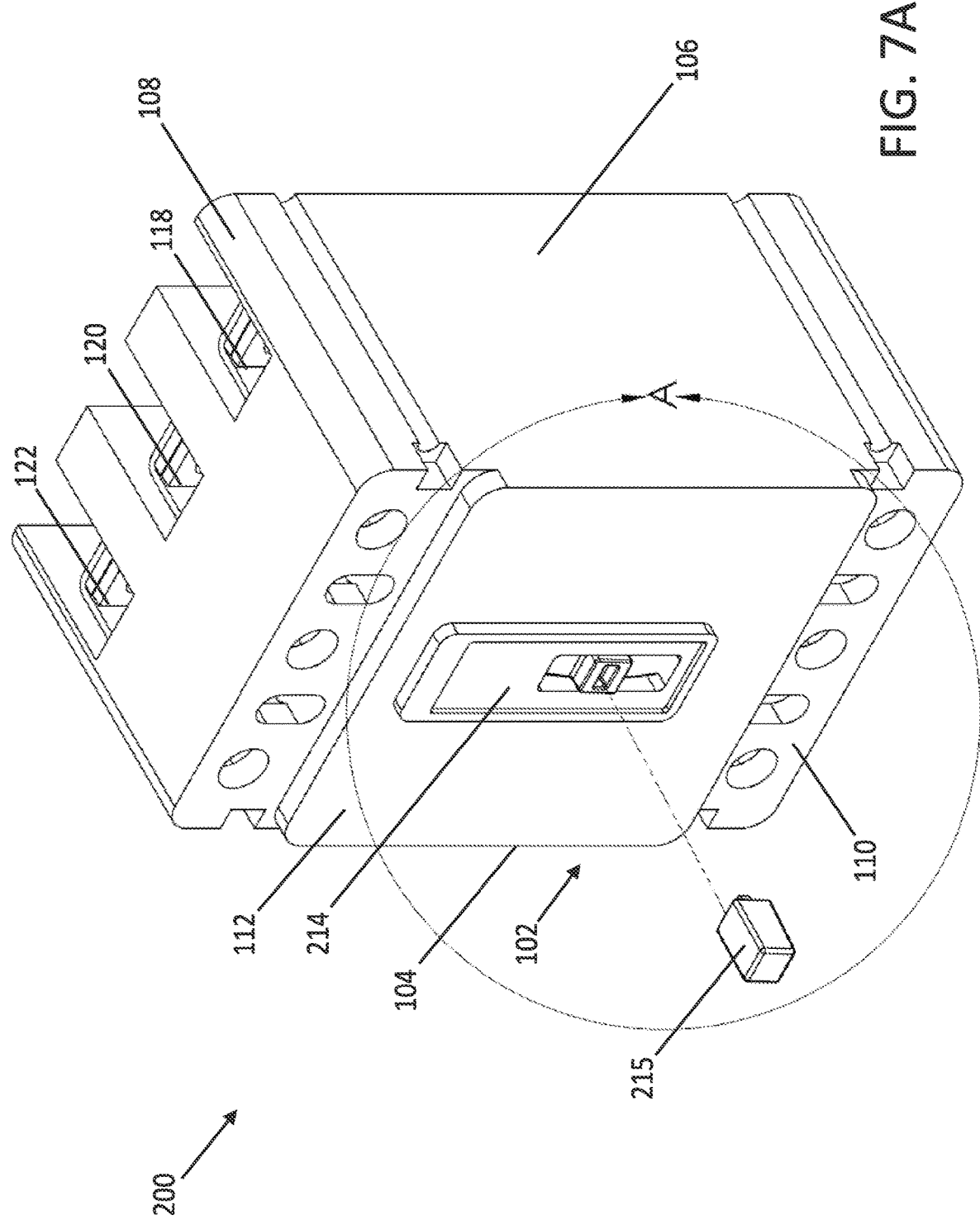
FIG. 7A is a perspective view of the compliant, hazardous location solid state circuit protection device shown in FIG. 4 with a field deployable adaptor device removed from the solid state circuit protection device.
Figure 7B:
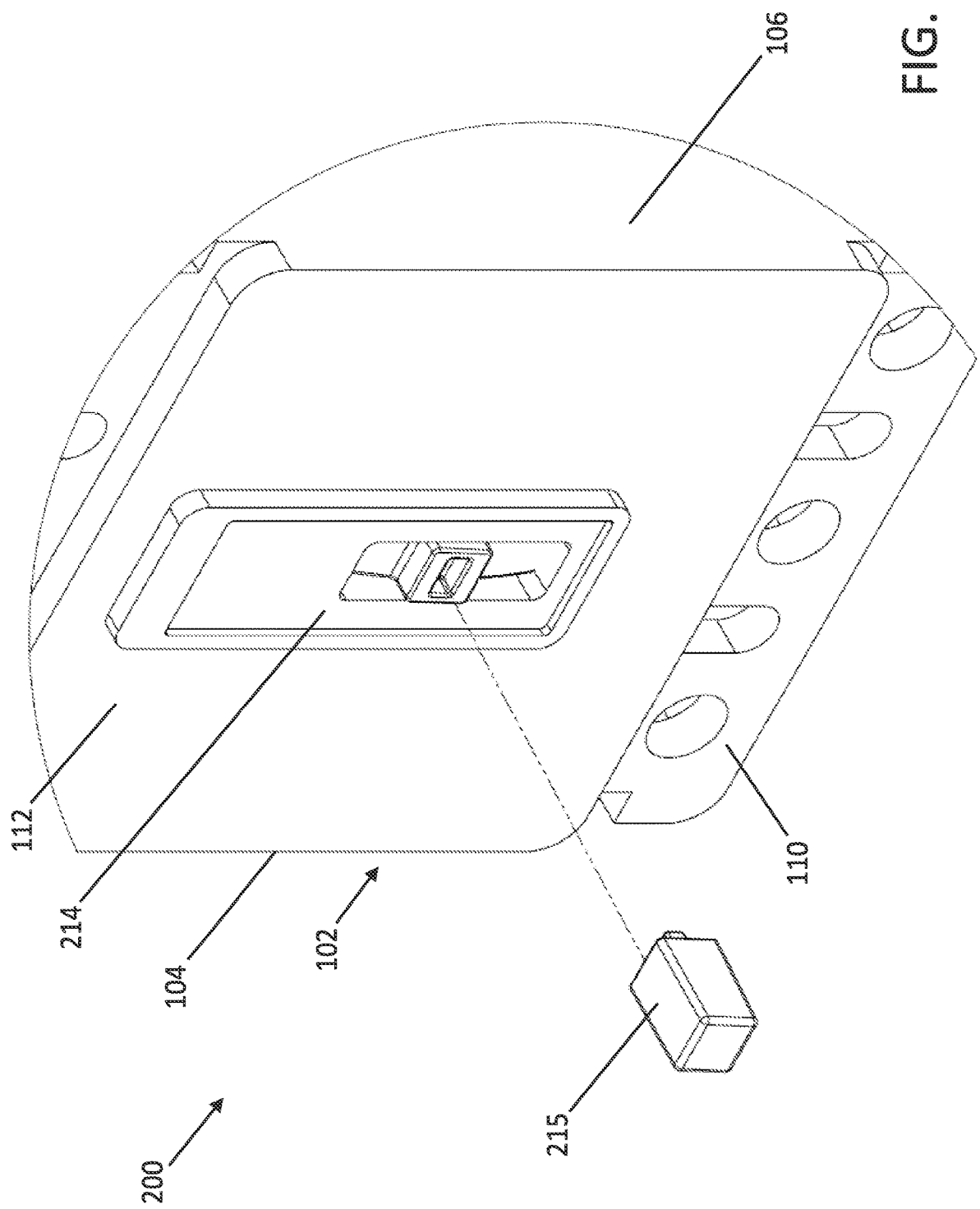
FIG. 7B is a zoomed in view of the compliant, hazardous location solid state circuit protection device shown in FIG. 7A.

In the embodiment shown in FIGS. 4, 5 and 6, the front side 112 of the housing 102 has a connection port 214 and a field deployable adaptor device 215. The field deployable adaptor device 215 beneficially simplifies the set-up of the device in the field and eliminates opportunity for user error, while eliminating factory programming and enabling more or less universally applicable circuit protection devices at lower cost by eliminating customized labeling and setting input selectors such as knobs, dials and buttons that add to the cost and complexity of manufacturing the devices. The field deployable adaptor device 215 is mechanically separate from the protection device 200, and is attachable to the connection port 214 (attached in FIGS. 4-6 and removed in FIGS. 7A-7B). The adaptor device 215 is configured to communicate with a processor-based load controller (such as the processor 150 shown in FIG. 2) and supply predetermined computer programs that include control algorithms or at predetermined settings for control algorithms that are pre-loaded onto the circuit protection device 200.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for use by the processor-based device 200 or other processor-based computing devices described below. Each computing device includes a memory device and a processor in communication with the memory device, and when executed by the processor the computer-executable instructions may cause the processor to perform one or more steps of a method such as the methods described herein.

By having the adaptor device 215 be mechanically separate from the circuit protection device 200, the device 200 may be universally used across different applications with the needed computer programs supplied by adaptor devices 215. The control algorithms may include any processes or process steps for the device 200 to detect operating conditions (e.g., voltage, current or temperature) and respond accordingly (e.g., trip to isolate the electrical loads or adopt energy limiting functionality) as well as any variable associated process or process steps with the circuit protection device 200, such as, but not limited to, trip characteristics for different time-current conditions or trip profiles, or adjusting operation in view of temperature limits, power limits, resistance limits, etc.

The circuit protection device 200 recognizes the algorithms and settings communicated by the adaptor device 215 and configures itself accordingly via downloading of software algorithms and setting information from the adaptor device 215 to the circuit protection device 200. Because the pre-programmed control algorithms or settings are predetermined by the manufacturer which provides the adapter 215, potential user error in manually programming the device 200 or selecting settings therefore is significantly reduced, which increases safety in hazardous and harsh environments. Loading of the software from the adaptor 215 in the field also eliminates costs to program the device, either partially or entirely, at the manufacturer level, such that the manufacturer may provide a basic, universally applicable device that may be customized via specific software algorithms and settings at the time of commissioning or deployment in the field as an installation step.

The control algorithms or settings on the adaptor device 215 are retrieved and stored in the memory 152 (FIG. 3) or the trip unit 160 of the device 200. In some cases, the adaptor device 215 may also work in reverse and retrieve control algorithm and setting data and information from the memory 152, the trip unit 160 or a load controller in the circuit protection device 200 for use in an additional protection device or for diagnostic and troubleshooting purposes. The mechanically separate adaptor device 215 with a pre-programmed control algorithms, setting data, and other information, allows the same circuit protection device 200 to be universally used across a wide variety of different power systems to meet different objectives.

The field deployable adaptor device 215 in an exemplary embodiment may be a software dongle which includes a universal serial bus (USB) device. Although the adaptor device 215 is shown as a dongle in FIGS. 4-7B, the adaptor device may alternatively be another type of device that may communicate with the processor-based controller of the circuit protection device 200 and realize similar effects and advantages.

The adaptor device 215 may wirelessly communicate with another processor-based user device (not shown), such as a smartphone, tablet computer, or computer device utilizing different wireless communication protocols. In contemplated embodiments, user devices may include IOS or Android operating systems and software apps for smart device control and management of devices 200. In different embodiments, the adaptor device 215 may be configured as a Radio Frequency Identification Device (RFID), a Bluetooth Low Energy (BLE) device, or a Near Field Communication (NFC) device. Alternatively, other types of wireless communication, including but not necessarily limited to cellular communication, may be utilized by the adaptor device 215 as desired to communicate with another computing device either locally or remotely. In contemplated embodiments, the local or remote device may be a user device, such as a smartphone utilized by a technician or power system administrator, to view the pertinent operational details of the circuit protection device 200 such as current, voltage, temperature, trip curves, limit information, etc. Cloud services for apps, storage, account management, networking, etc. may be employed for authorized user registration in order to communicate with devices 200 or the adaptors 215 therefore. User database populating and registration is performed in contemplated embodiments wherein individual users must register with database 212 via an internet portal app or directly with a power system administrator. For security, software application use and database access is strictly controlled by system administrators.

In addition the circuit protection device 200 may communicate with a plurality of other circuit protection devices 200 in a power system wirelessly through their respective adaptor devices 215 or the communication elements 164 (FIG. 3). This allows circuit protection devices 200 to verify one another's pre-programmed control algorithms or setting data and information for the pre-programmed control algorithms to ensure compatibility with one another in the electrical power system being protected. For example, if there is an incompatibility in a first, upstream circuit protection device's 200 control algorithm that may affect other downstream devices 200 in the system, or vice-versa, then one or both of the first and second circuit protection devices 200 in the system may notify a user of the incompatibility. As one example of this case, consider an upstream device 200 that has been configured via the pre-programmed dongle to have a current limit of 50 A, while a downstream device 200 has been configured via the pre-programmed dongle to have a current limit of 100 A. In such a scenario, which can be detected automatically via the two devices 200 communicating and comparing the current limits, a notice or alert can be generated and flagged for the attention of a technician or system administrator to resolve.

In some cases, a dongle of the first device 200 may send some or all of its software to the dongle of the second device (or vice-versa) to resolve inconsistencies. The dongles and devices 200 may include location identifiers allowing them to intelligently determine their specific location in the larger electrical system for configuration purposes and may send or receive software algorithms or setting data and information to one another when needed. Master and slave-type devices and architectures may be realized with intelligent devices sending pre-programmed control algorithms to one another based on their relative locations. Peer-to-peer or mesh networks may be established for self-configuration of devices 200.

Verification of the control algorithms or settings of the control algorithms by the circuit protection devices 200, in combination with feedback to the user through a user device, provides a further degree of assurance of the proper configuration of each device 200 that eliminates possible user error and increases safety in hazardous and harsh environments. Further, wireless communication of notices or alerts to a plurality of circuit protection devices 200 to a user or users flags possible problems in the power system that may otherwise be difficult to detect by a person, allowing action to be taken to minimizes consequences of incompatible device settings.

In contemplated embodiments, the dongle may be encoded with a device key which prevents a user from manipulating a program by checking to see if the pre-programmed control algorithm on the adaptor device 215 is approved. This stops malicious code from being uploaded into the circuit protection device 200 and frustrates hacking or other types of unauthorized access. In addition, the circuit protection device 200 may reject a dongle as not matching the specific device 200 when there are a plurality of devices 200 each having their own assigned dongle. When the dongle is rejected, the software on the dongle will not be loaded by the device 200.

The field deployable adaptor device 215 may also function as a mechanically moveable override toggle switch when inserted into the communication port 214. The adaptor device 215 in this embodiment may be a combination dongle and actuating switch. To facilitate this, the connection port may be integrated in a movable portion of a toggle switch mechanism for the device 200, such that the connection port and the adaptor device are selectively positionable relative to the housing of the device 200 is respectively different on and off positions.

By functioning as a mechanical toggle switch, the adaptor device 215 may be used similarly to a traditional toggle switch actuator of electromechanical switch as a manual on/off switch or override switch of the circuit protection device 200 when needed. It may further be used in maintenance as an additional backup to the pre-programmed control algorithm where the device 200 is automatically turned off. Having dual-functionality for the adaptor device 215 as an override switch increases safety in hazardous or harsh environments by providing a mechanical disconnect to supplement the pre-programmed control algorithm.

Figure 8:
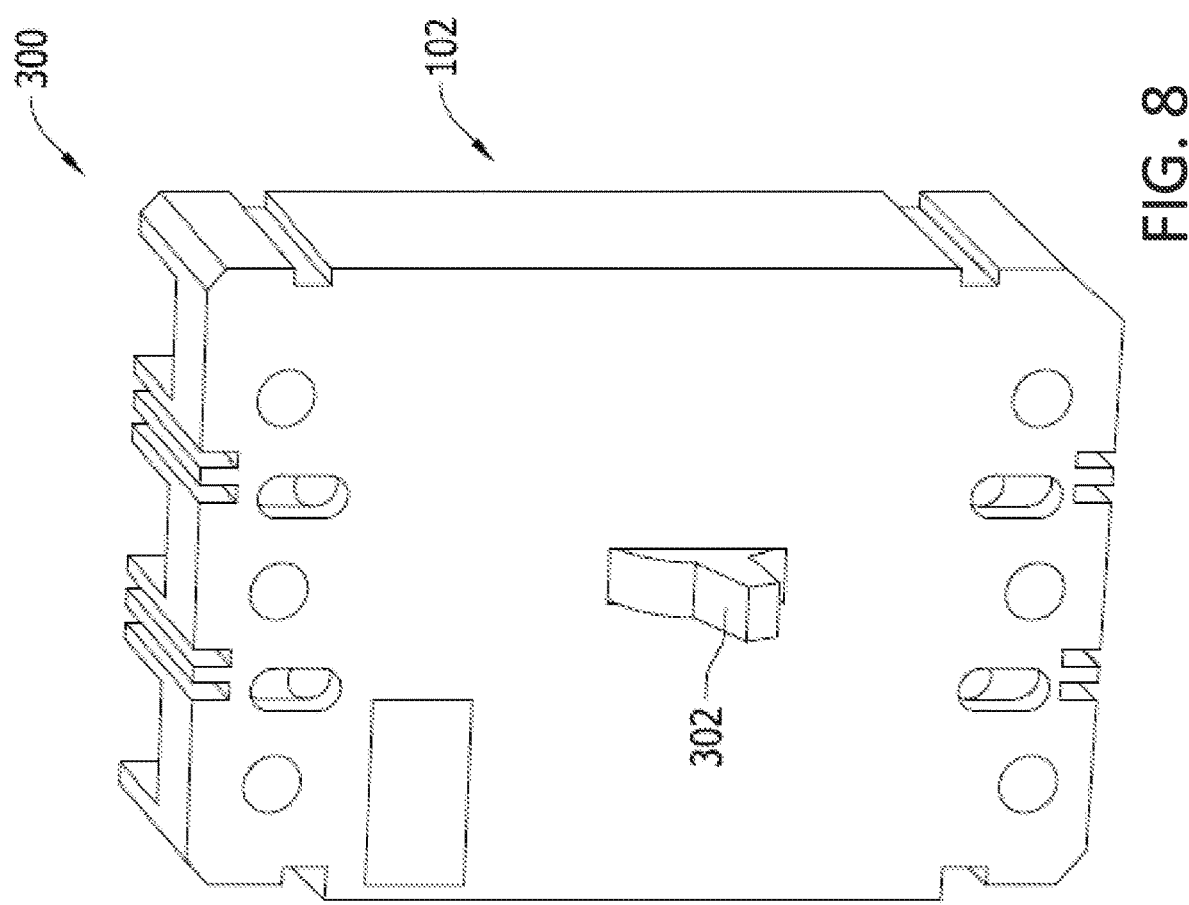
FIG. 8 is a perspective view of a compliant, hazardous location arc-less circuit protection device according to a third exemplary embodiment of the invention.

FIG. 8 is a perspective view of a compliant, hazardous environment arc-less circuit protection device 300 according to a third exemplary embodiment of the invention. The circuit protection device 300 includes the housing 102 described above in relation to the devices 100, 200, but omits the digital display 116 of the device 100 (FIG. 1). As shown in FIG. 8, a toggle switch 302 is accessible to a user on the upper face of the housing 102 for manual activation of the device 300 between "on" and "off" states to connect and disconnect the load-side of the device 300 from the line-side. Manual actuators other than toggle switches may be employed in other embodiments. In some cases, the display 116 could be provided in addition to or in lieu of the toggle switch 302 or another manual actuator.

Like the devices 100 200, the device 300 may interconnect line-side or power supply circuitry and electrical loads operating via alternating current (AC) or direct current (DC). The device 300 as shown is configured as a circuit breaker and therefore provides automatic circuit protection in response to predetermined overcurrent conditions, which may be in accordance with pre-programmed algorithms in an adaptor device 215. The device 300 may operate according to specified time-current characteristics suitable to provide adequate protection for connected loads, including but not necessarily limited to characteristics required for listing as a UL 489 circuit breaker in contemplated embodiments.

Figure 9:
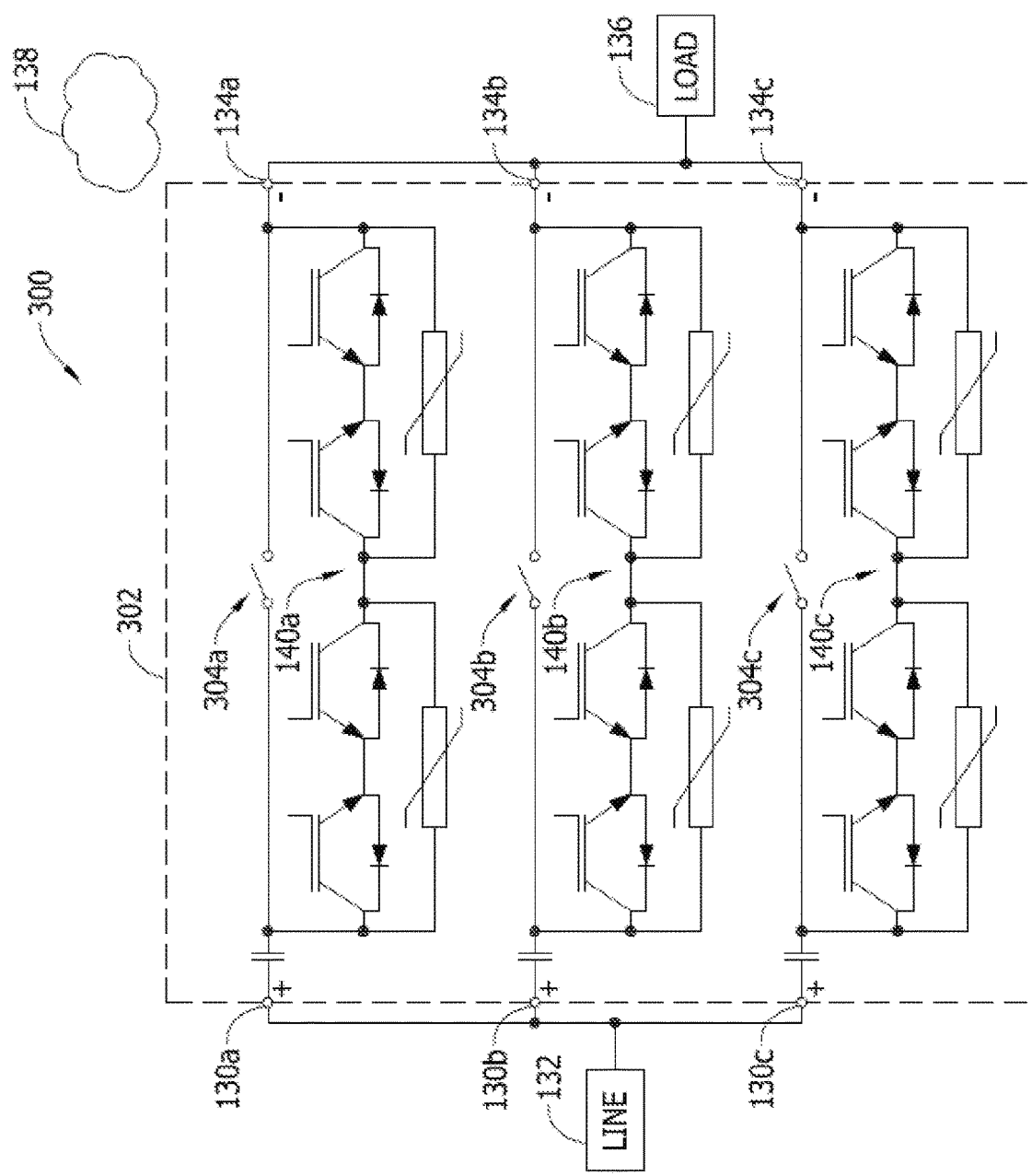
FIG. 9 is a simplified schematic diagram of the circuit protection device shown in FIG. 8 in an exemplary hybrid configuration.

FIG. 9 is a simplified schematic diagram of the circuit protection device 130 in an exemplary hybrid configuration. The device 300 includes input terminals 130a, 130b, 130c each connected to one phase of a three phase power supply indicated as line-side circuitry 132 via connecting cables, conduits, or wires. The device 300 further includes output terminals 134a, 134b, 136c each connected to load-side circuitry 136 such as motors, fans, lighting devices, and other electrical equipment in an industrial facility wherein ignitable gas, vapors or substances may be airborne as indicated at 138.

In between each pair of input terminals 130a, 130b, 130c and output terminals 134a, 134b, 136c are mechanical circuit breakers 304a, 304b, 304c and parallel connected solid state switch devices arranged as indicated at 140a, 140b and 140c. The exemplary solid state switch arrangement 140a, 140b, 140c includes series connected pairs of insulated-gate bipolar transistors (IGBTs) with each pair including a varistor element connected in parallel to the IGBTs as described above. While exemplary solid state switching arrangements are shown and described, others are possible to achieve solid state switching functionality in an arc-less manner. As discussed above, the solid state switching devices operate in an arc-less manner and therefore do not themselves present a risk of ignition insofar as arcing is concerned in the hazardous environment.

The combination of the mechanical circuit breakers 304a, 304b, 304c and the solid state switching arrangements 140a, 140b and 140c can improve response times of the device 300 relative to that of the device 100. The mechanical circuit breakers 304a, 304, 304c however, operate with mechanical switch contacts and accordingly deserve some attention to a hazardous location application as arcing can be an ignition source. The solid state switching arrangements 140a, 140b and 140c that are connected in parallel to the mechanical circuit breakers 304a, 304b, 304c can limit the current in mechanical circuit breakers 304a, 304, 304c in an overload or short circuit event to reduce intensity of any arc produced to a level below that required to present an ignition concern, or otherwise preclude arcing altogether.

Figure 10:
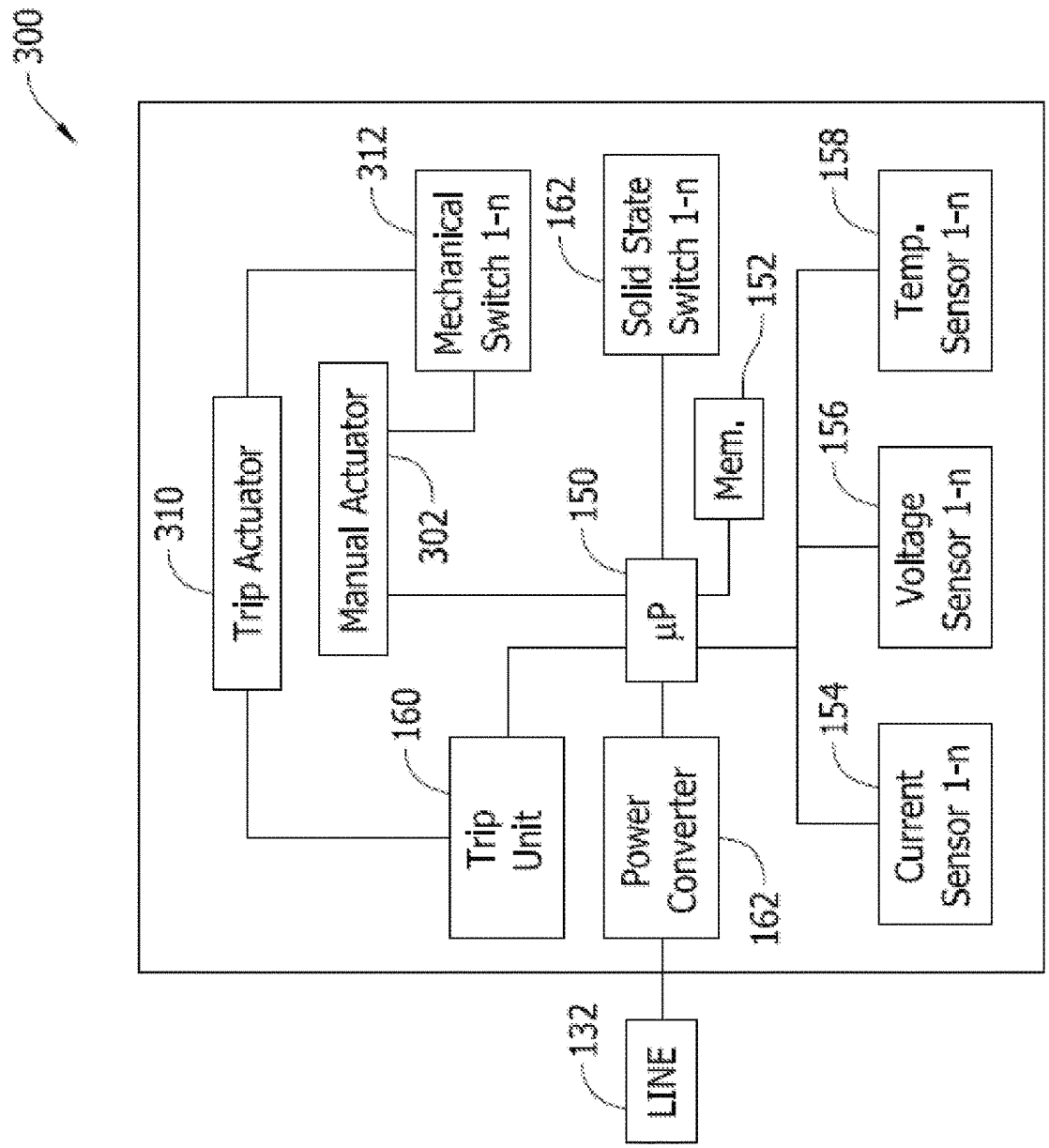
FIG. 10 is a block diagram of the circuit protection device shown in FIGS. 8 and 9.

FIG. 10 is a block diagram of the circuit protection device 300 including, in addition to the elements described above in the device 100, control inputs for the manual actuator 302, and a trip actuator 310 for operating the mechanical circuit breakers 312 including the mechanical switches. When predetermined overcurrents are detected, the trip unit 160 causes the trip actuator 310 to displace the movable switch contacts and open the circuit through the device 300. The trip actuator may be an electromagnetic member such as a solenoid that can simultaneously displace the switch contacts of each mechanical contact provided in the device 300, with the solid state switching arrangements 140a, 140b and 140c limiting the current as the displacement of the switch contacts occurs. The manual actuator 302 can thereafter be used to reset the device 300 by closing the mechanical contacts.

While an exemplary architecture of the device 300 has been described, it is understood that certain of the elements shown in FIG. 10 may be considered optional to provide more basic functionality, as well as additional elements could be added to realize still further sophistication and intelligence in the operation of the device 300.

Having described devices and applicable operating algorithms functionally per the description above, those in the art may accordingly implement the algorithms via programming of the controllers or other processor-based devices. Such programming or implementation of the concepts described is believed to be within the purview of those in the art and will not be described further.

The benefits and advantages of the inventive concepts are now believed to have been amply illustrated in relation to the exemplary embodiments disclosed.

An embodiment of an electrical circuit protection device for a hazardous location has been disclosed. The electrical circuit protection device includes a housing, a line-side terminal, and a load-side terminal coupled to the housing. The device further includes at least one solid state switching element operable in an arc-free manner to limit or preclude electrical current flow from the line-side terminal to the load-side terminal. The device also includes a processor-based controller in the housing that is configured to operate the at least one solid state switching element in a manner responsive to a variety of different time-current conditions to protect a plurality of different electrical loads. The device further includes a field deployable adaptor device configured to communicate with the processor-based controller. The field deployable adaptor device configures the processor-based controller with at least one pre-preprogrammed control algorithm executable by the processor-based controller or at least one selected setting for a control algorithm executable by the processor-based controller. The at least one pre-preprogrammed control algorithm is executable or at the least one selected setting for a control algorithm is predetermined by a manufacturer of the circuit protector device.

Optionally, the field deployable adaptor device may be a dongle. The dongle may be a universal serial bus (USB) dongle. The dongle may be configured to communicate wirelessly with a separate computing device. The dongle may be configured as a radio frequency identification device (RFID), a Bluetooth Low Energy (BLE) connection device, or a Near Field Communication (NFC) device. The dongle may be encoded with a device key or a user key. The dongle may function as a mechanical toggle switch for the circuit protection device when connected.

As further options, the electrical circuit protection device may include at least one connection port configured to mechanically receive and establish communication with the field deployable adaptor device. At least one connection port may be integrated in a movable portion of a toggle switch mechanism for the circuit protection device. The field deployable adaptor device may be a dongle in these options as well.

Also optionally, the housing of the device may be ignition protected for use in a hazardous location without a separately provided explosion-proof enclosure. The device also may include at least one temperature sensor, and wherein the at least one solid state switch element is operable by the processor-based controller in response to input from the at least one temperature sensor to limit or preclude electrical current flow from the line-side terminal to the load-side terminal and maintain an operating temperature of the circuit protection device below a rated temperature limit, thereby rendering the circuit protection device compliant for use in the hazardous location without requiring a separately provided explosion-proof enclosure.

Optionally, at least one mechanical switch contact may be connected between the line-side terminal and the load-side terminal in the switch device, and wherein the housing may include a sealed internal enclosure containing the at least one mechanical switch contact, thereby precluding the switch contact from being an ignition source in a hazardous location and rendering the circuit protection device compliant for use in the hazardous location without requiring a separately provided explosion-proof enclosure.

The at least one solid state switching element may be encapsulated. The device may be configured by the field deployable adaptor device as a circuit breaker device. The housing may be electrically grounded. The housing may exhibit anti-static properties. The housing may be chemically resistant for use in a hazardous location without a separately provided enclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical circuit protection device comprising:
    a housing;
    a line-side terminal and a load-side terminal coupled to the housing;
    at least one solid state switching element operable in an arc-free manner to limit or preclude electrical current flow from the line-side terminal to the load-side terminal;
    a processor-based controller in the housing and being configured to operate the at least one solid state switching element in a manner responsive to a variety of different time-current conditions to protect a plurality of different electrical loads; and
    a field deployable adaptor device configured to communicate with the processor-based controller and configure the processor-based controller with at least one pre-preprogrammed control algorithm executable by the processor-based controller or at least one selected setting for a control algorithm executable by the processor-based controller, wherein the field deployable adaptor device is a dongle that is functional as a mechanical toggle switch for the circuit protection device when connected;
    wherein the at least one pre-preprogrammed control algorithm executable or at the least one selected setting are predetermined by a manufacturer of the circuit protector device.

2. The electrical circuit protection device of claim 1, wherein the dongle is a universal serial bus (USB) dongle.

3. The electrical circuit protection device of claim 1, wherein the dongle is configured to communicate wirelessly with a separate computing device.

4. The electrical circuit protection device of claim 3, wherein the dongle is configured as a radio frequency identification device (RFID).

5. The electrical circuit protection device of claim 3, wherein the dongle is configured as a Bluetooth Low Energy (BLE) connection device.

6. The electrical circuit protection device of claim 3, wherein the dongle is configured as a Near Field Communication (NFC) device.

7. The electrical circuit protection device of claim 1, wherein the dongle is encoded with a device key or a user key.

8. The electrical circuit protection device of claim 1, further comprising at least one connection port configured to mechanically receive and establish communication with the field deployable adaptor device.

9. The electrical circuit protection device of claim 8, wherein the at least one connection port is integrated in a movable portion of a toggle switch mechanism for the circuit protection device.

10. The electrical circuit protection device of claim 8, wherein the field deployable adaptor device is a dongle.

11. The electrical circuit protection device of claim 1, wherein the housing of the electrical circuit protection device is ignition protected for use in a hazardous location without a separately provided explosion-proof enclosure.

12. The electrical circuit protection device of claim 1, further including at least one temperature sensor, and wherein the least one solid state switch element is operable by the processor-based controller in response to input from the at least one temperature sensor to limit or preclude electrical current flow from the line-side terminal to the load-side terminal and maintain an operating temperature of the circuit protection device below a rated temperature limit, thereby rendering the circuit protection device compliant for use in the hazardous location without requiring a separately provided explosion-proof enclosure.

13. The electrical circuit protection device of claim 1, further comprising at least one mechanical switch contact connected between the line-side terminal and the load-side terminal in the switch device, and wherein the housing includes a sealed internal enclosure containing the at least one mechanical switch contact, thereby precluding the switch contact from being an ignition source in a hazardous location and rendering the circuit protection device compliant for use in the hazardous location without requiring a separately provided explosion-proof enclosure.

14. The electrical circuit protection device of claim 1, wherein the at least one solid state switching element is encapsulated.

15. The electrical circuit protection device of claim 1, wherein the electrical circuit protection device is configured by the field deployable adaptor device as circuit breaker device.

16. The electrical circuit protection device of claim 1, wherein the housing of the electrical circuit protection device is electrically grounded.

17. The electrical circuit protection device of claim 1, wherein the housing of the circuit protection device exhibits anti-static properties.

18. The electrical circuit protection device of claim 1, wherein the housing of the circuit protection device is chemically resistant for use in a hazardous location without a separately provided enclosure.

19. An electrical circuit protection device, comprising:
a housing;
a line-side terminal and a load-side terminal coupled to the housing;
at least one solid state switching element operable in an arc-free manner to limit or preclude electrical current flow from the line-side terminal to the load-side terminal;
a processor-based controller in the housing and being configured to operate the at least one solid state switching element in a manner responsive to a variety of different time-current conditions to protect a plurality of different electrical loads;
a field deployable adaptor device configured to communicate with the processor-based controller and configure the processor-based controller with at least one pre-preprogrammed control algorithm executable by the processor-based controller or at least one selected setting for a control algorithm executable by the processor-based controller; and
at least one connection port configured to mechanically receive and establish communication with the field deployable adaptor device;
wherein the at least one pre-preprogrammed control algorithm executable or at the least one selected setting are predetermined by a manufacturer of the circuit protector device;
wherein the at least one connection port is integrated in a movable portion of a toggle switch mechanism for the circuit protection device.

20. The electrical circuit protection device of claim 19, wherein the field deployable adaptor device is a dongle that is functional as a mechanical toggle switch for the circuit protection device when connected.

* * * * *